United States Patent [19]
Mizutani et al.

[11] Patent Number: 5,780,530
[45] Date of Patent: Jul. 14, 1998

[54] THERMOSETTING RESIN COMPOSITION

[75] Inventors: Keita Mizutani, Suita; Saori Yoshimatsu, Toyonaka; Kinya Yamakawa, Nishinomiya, all of Japan

[73] Assignee: Nippon Paint Co., Ltd., Osaka, Japan

[21] Appl. No.: 820,674

[22] Filed: Mar. 18, 1997

[30] Foreign Application Priority Data

| Mar. 19, 1996 | [JP] | Japan | 8-090132 |
| Aug. 28, 1996 | [JP] | Japan | 8-247013 |
| Aug. 28, 1996 | [JP] | Japan | 8-247014 |

[51] Int. Cl.$^6$ .............. C08K 9/06; C08L 83/06; B05D 3/02
[52] U.S. Cl. .............. 523/209; 524/588; 524/858; 524/860; 528/17; 427/387; 427/388.1
[58] Field of Search ............ 528/29, 17; 524/588, 524/858, 860; 523/209

[56] References Cited

U.S. PATENT DOCUMENTS

| 4,732,929 | 3/1988 | Chang et al. | 528/29 |
| 5,408,001 | 4/1995 | Nakahata et al. | 525/104 |
| 5,525,660 | 6/1996 | Shiono et al. | 524/588 |
| 5,643,973 | 7/1997 | Miyabayashi | 524/588 |

*Primary Examiner*—Tae Yoon
*Attorney, Agent, or Firm*—Millen, White, Zelano & Branigan, P.C.

[57] ABSTRACT

A thermosetting resin or coating composition contains (a) a film-forming polyol resin, (b) a curing agent reactive with the polyol resin, (c) a hydrolyzate/polycondensate of tri- or tetraalkoxysilane, and (d) a catalyst for promoting the reaction between the polyol resin (a) and the curing agent (b).

14 Claims, No Drawings

5,780,530

THERMOSETTING RESIN COMPOSITION

BACKGROUND OF THE INVENTION

This invention relates to a thermosetting resin composition for coating use.

Coating compositions for finishing exterior building materials, road materials used as fences, guard rails, poles or tunnel linings, vehicles including motor cars, aircrafts and other outdoor substrates require to have resistance against blotting or staining with oily marker inks, foods, tobacco smoke, dust and dust-containing rain drops. They also require to have resistance to acid or alkali. Acid rain or acid exhaust gas may deteriorate or stain coating films. Coating films on building sidings may be deteriorated with alkali included in concrete or mortar walls. Coating films on steel substrates are susceptible to alkaline cathodic disbanding. Coating films applied on various products of indoor use such as household electrical appliances, kitchen utensils, furnitures and interior building materials also require resistance to blotting with oily marker inks, foods or tobacco smoke and resistance to alkaline detergents and alkaline cathodic disbanding. Hardness is one of the important properties of coating films so that they are not easily scratched with washing brushes or sand dust when exposed outdoor. Usually a pencil hardness greater than 4H is required.

However, it is difficult for the coating films to meet the hardness requirement and all of other requirements simultaneously. For example, resistance to blotting with oil marker inks may be improved by incorporating silicone or fluorocarbon resins into the coating composition but this approach is not effective to satisfy with other properties including the hardness and resistance to staining with dust-containing rain drops.

JP-A-6145453, JP-A-7150102, JP-A-7068217 and WO 94/06879 disclose outdoor coating compositions comprising a polymer containing a plurality of alkoxysilyl groups and optionally silanol groups. The polymer is crosslinked in the coating composition with a tetraalkoxysilane or a condensate thereof. These compositions utilize a condensation reaction of silanol groups with each other or with hydroxyl groups possessed by the polymer as the curing mechanism thereof. Alkoxysilyl groups remaining on the surface portion of coating films are hydrolyzed to silanol groups with rain or by treating with acid to increase the hydrophilicity of the surface so that the films are easily cleaned from deposited pollutants by rain or washing with water. These compositions, however, suffer from certain defects. The —Si—O—Si or —Si—O—C— linkages formed by the curing reaction are easily broken with acid or alkali and fine cracks are formed when alkoxysilyl groups remain in the body of films. The curing mechanism of these coating compositions is essentially the same as the curing mechanism of moisture-curable silicone rubber. As will be apparent from this, they have only a limited storage or pot life.

WO 95/17349 discloses a suspension containing reactive ultrafine silica particles with an inertial radius of 10 angstrom or less. This suspension is self-curable and gives a very hard film having a pencil hardness of 9H or higher when applied on a substrate and then baked. Because the film essentially consists of noncrystalline silica, it is excellent in hardness and heat resistance but exhibits poor flexibility when compared with conventional organic polymer-based resin compositions. Therefore, the above silica particle suspension per se is not suitable for use in the manufacture of precoated metal sheet (PCM) and other applications where coated substrates are subsequently subjected to a mechanical treatment such as bending.

A need exists, therefore, for a thermosetting resin composition for coating use which is capable of forming a cured film having a pencil hardness of 4H or higher without compromising other desired properties such as anti-soiling and anti-chemical properties including acid and alkali resistance.

SUMMARY OF THE INVENTION

The present invention provides a thermosetting resin composition comprising:

(a) a film-forming polyol resin having a hydroxyl number from 5 to 300 and a number average molecular weight from 500 to 20,000;

(b) a curing agent reactive with said resin (a);

(c) a hydrolyzate/polycondensate of tri- or tetraalkoxysilane having a percent hydrolysis/dealcohlation of less than 100%; and (d) a catalyst for promoting the reaction between said resin (a) and said curing agent (b).

The present invention also provides a coating composition containing said thermosetting resin composition and the use of said coating composition.

The thermosetting resin composition of the present invention is a composite system comprising a silicate component and an organic resin component. When a coating film of the composition is formed on a substrate and then baked, the silicate component cures by itself through a self-condensation reaction forming essentially inorganic non-crystalline silica particles dispersed in the matrix of the organic resin component which cures through a reaction with an external curing agent. Beside this, it is postulated that a portion of hydroxyl groups of the resin component and a portion of alkoxysilyl or silanol groups of the silicate component react with each other to couple these components with chemical linkages in an integral film structure. Accordingly, each of individual components may exhibit its inherent characteristics in the cured film. The silicate component mainly contributes to the hardness and the organic resin component shares other desirable properties. For example, coating compositions for precoated metal sheet application may be formulated using mechanically workable resins as the matrix resin. Films having high weatherability and anti-soiling properties are obtained using silicone or fluorine-containing resins as the matrix resin.

DESCRIPTION OF PREFERRED EMBODIMENTS

Component (a)

Polyol resins curable with an external curing agent such as blocked polyisocyanates or aminoplast resins are well-known in the coating industry. Examples thereof are acrylic polyol resins, polyester polyol resins, fluorine-containing polyol resins, silicone polyol resins and a modified resin thereof. The polyol resins usable in the present invention have a hydroxyl number of from 5 to 300, preferably from 30 to 200, and a number average molecular weight of from 500 to 20,000, preferably from 1,800 to 20,000. Polyol resins will not be fully cured when the hydroxyl number is too low. Conversely, an excessively large number of hydroxyl groups in the resin will adversely affect the resistance of the cured film to water, acid and alkali. The molecular weight of the resin corelates to the mechanical strength of the cured film but resins having excessively large molecular weights will have an excessively high viscosity in the coating composition thereby decreasing the coatability of the composition by spraying or roller coating.

The polyol resins may be modified with an appropriate component or segment depending upon the intended application of the coating composition. For example, acrylic or polyester polyols may be modified to have a silicone segment. The polyol resins may also be modified to have a functional group other than hydroxyl group such as carboxyl or alkoxysilyl. If the resins are modified to have alkoxysilyl groups, it is preferable for the modified resin to have an alkoxysilyl equivalent weight (the molecular weight divided by the number of alkoxysilyl groups in the molecule) of greater than 650. Other parameters of the polyol resins should be within a range which is normally required for film-forming resins for coating use. For example, Tg (glass transition temperature) ranges from −20° C. to 60° C. Resins with excessively low Tg will not give a cured film having a satisfactory mechanical strength. Conversely, excessively high Tg of the resin will result in brittle films susceptible to cracks. The acid number of the resin should be less than 30. Resins with excessively high acid number may catalyze the hydrolysis or condensation reaction of the remaining alkoxysilyl groups of the silicate component (c) and, therefore decrease the storage stability of the coating composition when exposed to the atmospheric moisture. Further details of individual polyol resins are given below.

Acrylic polyol resin

Acrylic polyol resins are produced by copolymerizing a hydroxyl group-containing acrylic monomer with other ethylenically unsaturated monomers. Examples of hydroxyl group-containing acrylic monomers are 2-hydroxyethyl (meth)acrylate, 2-hydroxypropyl (meth)acrylate, 4-hydroxybutyl (meth)acrylate or other hydroxyalkyl (meth) acrylate. Depending upon intended applications, for example for PCM use, soft segment-containing monomers such as 2-hydroxyethyl (meth)acrylate-caprolactone adducts sold by Daicel Chemical Industries, Limited under the trade name of PLACCEL FA and FM series, or polyalkylene glycol mono(meth)-acrylate may be combined with the hydroxylalkyl (meth)-acrylate monomer.

Examples of ethylenically unsaturated monomers copolymerizable with the hydroxyl group-containing acrylic monomer include alkyl (meth)acrylates such as methyl, ethyl, propyl, n-butyl, i-butyl, t-butyl, 2-ethylhexyl or lauryl (meth)acrylate; aromatic vinyl monomers such as styrene or vinyltoluene; and other monomers such as acrylonitrile, vinyl acetate, acrylic acid, methacrylic acid or glycidyl (meth)acrylate. Optionally amino or amide monomers such as 2-dimethylaminoethyl (meth)acrylate, 2-diethylaminoethyl(meth)acrylate, (meth)acrylamide, N-methyl- or ethyl(meth)acrylamide or N,N-dibutoxymethyl(meth)acrylamide.

As stated before, acrylic polyol resins may be modified to have a plurality of alkoxysilyl group-containing pendant groups. These modified acrylic polyols are produced by copolymerizing a mixture of the above hydroxyl group-containing monomer and the other ethylenically unsaturated monomer with an alkoxysilane monomer having one ethylenically unsaturated group, from zero to two hydrocarbon radicals such as methyl group, and one to three alkoxy groups all attached to the same silicon atom. Typical examples thereof include vinylmethyldimethoxy-silane, γ-acryloyloxypropylmethyldimethoxysilane, vinyltrimethoxysilane, γ-acryloyloxypropyltrimethoxysilane, γ-methacryloyloxypropylmethyldimethoxysilane (KBM502), γ-methacryloyloxypropyltrimethoxysilane (KBM503), γ-methacryoyloxypropylmethyldiethoxysilane (KBE502), γ-methacryloyloxypropyltriethoxysilane (KBE503), and γ-|2-(propen-2-yloxycarbonyl)benzoyloxy|-propylmethyldimethoxysilane. KBM502, KBM503, KBE502 and KBE503 are commercially available from Shin-Etsu Chemical Co., Ltd. The proportion of the alkoxysilane monomer is such that the resulting copolymer has an alkoxysilyl equivalent weight greater than 650, preferably greater than 900, and most preferably about 1500. The term "alkoxysilyl equivalent weight" refers to the molecular weight divided by the number of alkoxysilyl groups in the molecule. When the alkoxysilyl equivalent weight is too small, namely too many alkoxysilyl groups are present in the copolymer, the acid or alkali resistance of the coating film will be adversely affected due to the formation of —Si—O—Si— and —Si—O—C— linkage upon curing and the coating composition tends to gel when exposed to moist air or become susceptible to cracks when cured films are formed therefrom.

Polyester polyol resin

As is well-known in the art, polyester resins are a polycondensate of a polycarboxylic acid component and a polyhydric alcohol component. Examples of polycarboxylic acids include aromatic dicarboxylic acids and acid anhydrides such as terephthalic acid, isophthalic acid, phthalic acid and its anhydride, 2,6-naphthalenedicarboxylic acid, or 2,7-naphthalenedicarboxylic acid; and aliphatic dicarboxylic acids such as succinic acid, adipic acid, azelaic acid, sebacic acid, dodecanedicarboxylic acid, or 1,4-cyclohexanedicarboxylic acid. A small proportion of lactones such as γ-butyrolactone or ε-caprolactone; their corresponding hydroxycarboxylic acids; aromatic hydroxymonocarboxylic acids such as p-hydroxyethroxybenzoic acid or p-hydroxybenzoic acid; and tri- or tetracarboxylic acids such as trimellitic acid or pyromellitic acid may be incorporated into the acid component.

Examples of the alcohol component include ethylene glycol, 1,3-propanediol, 1,4-butanediol, 1,5-pentanediol, 1,6-hexanediol, diethylene glycol, triethylene glycol, 1,4-cyclohexanediol, bisphenol A-ethylene oxide adducts and bisphenol S-ethylene oxide adducts. Branched chain-aliphatic glycols such as 1,2-propanediol, neopentyl glycol, 1,2-butanediol, 1,3-butanediol, 2,3-butanediol, 1,2-pentanediol, 2,3-pentanediol, 1,4-pentanediol, 1,4-hexanediol, 2,5-hexanediol, 3-methyl-1,5-pentanediol, 1,2-dodecanediol or 1,2-octanediol may also be used. The alcohol component may also include a small proportion of a tri- or tetrahydric alcohol such as trimethylolpropane, glycerine or pentaerythritol.

Polyester polyol resin may contain a silicone or acrylic component incorporated into the resin molecule. The silicone component may be incorporated, for example, by using as a portion of the polyhydric alcohol component a polysiloxane having a plurality of hydroxyalkyl groups. Such resins are commercially available, for example, from Hitachi Chemical Polymer Co., Ltd. under the trade name of TA22-293J which has a hydroxyl number of about 170 and a number average MW of about 2,400.

Fluorine-containing polyol resin

Fluorine-containing polyol resins are produced by copolymerizing (i) a hydroxyl group-containing, radically polymerizable unsaturated monomer with (ii) a fluorinated olefin monomer and optionally with (iii) another radically polymerizable unsaturated monomer. Examples of monomers (i) include hydroxyalkyl vinyl ethers such as hydroxyethyl vinyl ether, hydroxypropyl vinyl ether, hydroxybutyl vinyl ether or hydroxypentyl vinyl ether; and monoallyl ethers of mono-, di- or triethylene glycol.

Examples of monomers (ii) include mono-, di-, tri- or tetrafluorinated olefins such as vinyl fluoride, vinylidene fluoride, trifluorochloroethylene and tetrafluoroethylene.

Monomers (iii) are incorporated depending upon the properties of films required for particular applications. Examples thereof include α-olefins such as ethylene, propylene or isobutylene; vinyl ethers such as ethyl vinyl ether, isobutyl vinyl ether, butyl vinyl ether or cyclohexyl vinyl ether; vinyl esters such as vinyl acetate, vinyl lactate, vinyl butyrate, vinyl isobutyrate, vinyl caproate or vinyl caprate; and isopropenyl esters such as isopropenyl acetate or isopropenyl propionate.

If necessary, the fluorine-containing polyol resin may have an acid number. This may be accomplished by reacting a portion of the hydroxyl groups of the resin with a dicarboxylic acid anhydride such as succinic anhydride.

The term "fluorine-containing polyol resin" as used herein is intended to include a blend of a fluorine-containing resin free of hydroxyl group and an acrylic polyol resin as described above. The fluororesin free of hydroxyl group may be a homopolymer of monomer (ii) or a copolymer thereof with monomer (iii). The acrylic polyol resin may be a copolymer of monomer (i). Examples of copolymerizable monomers include hydroxyalkyl (meth) acrylate such as 2-hydroxyethyl acrylate, 2-hydroxypropyl acrylate, 2-hydroxyethyl methacrylate or 2-hydroxypropyl methacrylate; alkyl (meth)acrylate; ethylenically unsaturated carboxylic acid such as acrylic or methacrylic acid; aromatic vinyl monomers such as styrene, α-methylstyrene or vinyl toluene; amide monomers such as acrylamide, methacrylamide or their derivatives; and nitrile monomers such as acrylonitrile or methacrylonitrile.

A variety of fluororesins and hydroxyl group-containing fluororesins are commercially available. They are classified as polyvinylidene difluoride (PVDF) type, trifluoro- and tetrafluoroethylene vinyl ether (FEVE) types. A PVDF resin is available from Elf Atochem as KYNAR 500. This resin does not contain hydroxyl groups and, therefore, is used for blending with the acrylic polyol resin. Examples of commercially available tri-FEVE resins are LUMIFRON series sold by Asahi Glass Co., Ltd., FLUONATE series sold by Dainippon Ink And Chemicals, Inc., and SEFRALCOAT series sold by Central Glass Co., Ltd. Examples of tetra-FEVE resins are ZEFFLE series sold by Daikin Industries, Ltd. Fluorinated acrylic resins such as KOTAX sold by Toray Industries, Inc. may also be used. These resins may be used as such or as a blend with the acrylic polyol resin for adjusting the hydroxyl number of the blend. Tri- or tetra-FEVE resins are preferable from the viewpoint of durability.

Silicone polyol resins

The term "silicone polyol resin" as used herein refers to an organopolysiloxane having at least two hydroxyl groups in the molecule. The term "modified silicone polyol resin" as used herein refers to the above organopolysiloxane blended or grafted with another resinous component. The organopolysiloxanes can be represented by the general formula:

$$(R_a)_n(R_b)_mSi(O)_{(4-n-m)/2}$$

wherein $R_a$ is methyl, $C_1$–$C_{20}$ alkoxy, aryl, hydrogen or a monovalent $C_2$–$C_{200}$ organic group optionally containing ester, ether, urethane or carbon-to-carbon unsaturated function in the chain; $R_b$ is a monovalent organic group having a terminal hydroxyl group and optionally containing ester, ether, urethane or carbon-to-carbon unsaturated function in the chain; m and n are each a positive real number satisfying the relationship of 0<n<4; 0<m<4 and 2<n+m<4. Silicone polyol resins of the above general formula are disclosed in JP-A-2061481 cited supra, of which disclosure is incorporated herein by reference. Preferable organopolysiloxanes of the above general formula are those wherein $R_a$ is $HOC_2H_4OC_3H_6$—, $R_b$ is methyl, propyl, or phenyl, n and m are each a real number satisfying the relationship of 0<n<2, 0<m<2, and n+m<3. The silicone polyol resins of this class are preferable for production, workability and curability reasons. Particularly preferable resins are those of the general formula:

wherein $R_a$ is methyl or phenyl, $R_b$ is $HOC_2H_4OC_3H_6$—, x is 0 or 1, y is an integer from 1 to 20, and z is an integer from 1 to 10, and wherein the mole percent of phenyl in $R_a$ is from 10 to 50. Specific examples of silicone polyols of this class are also disclosed in the above-cited JP-A-2061481. These resins are well compatible with other polyol resins.

The silicone polyol resins are used as a blend with other polyol resins having a hydroxyl number from 5 to 300. Acrylic polyol resins, polyester polyol resins or fluororesin polyols as described hereinbefore may be blended with the silicone polyol resin. Other hydroxyl group-containing resins such as alkyd resins, acrylic modified alkyd resins, acrylic modified polyester resins or epoxy resins derived from bisphenol A and epichlorohydrin may also be blended. Alternatively, all or a portion of other polyol resins may be reacted with the silicone polyol resin to chemically combine together. This method comprises the steps of reacting a hydroxyalkyl group-containing trisiloxane with an ethylenically unsaturated compound having a functional group such as maleic anhydride to introduce ethylenic unsaturation into the siloxane, and then copolymerizing the product with an acrylic or vinyl monomer.

The silicone polyol resin and the other polyol resin are combined in weight proportions of 3–70 parts and 97–30 parts, preferably 5–40 parts and 95–60 parts, respectively. The silicone polyol can fully exhibit its characteristics including weatherability and chemical resistance. Excessive proportions of the silicone polyol resin are often incompatible with other polyol resins in the blend. By combining other polyol resins with the silicone polyol resin, it is possible to adjust the compatibility with other additives, pigment dispersion stability, and other properties required for the film including adhesion strength, elongation and hardness.

Component (b)

The first class of curing agents are blocked polyisocyanates. Polyisocyanates have at least two isocyanato groups in the molecule. Examples thereof include aliphatic diisocyanates such as hexamethylenediisocyanate (HMDI) or trimethylhexamethylenediisocyanate (TMDI); alicyclic diisocyanates such as isophoronediisocyanate (IPDI); araliphatic diisocyanates such as xylylenediisocyanate (XDI); aromatic diisocyanates such as tolylenediisocyanate (TDI) or 4,4'-diphenylmethanediisocyanate (MDI); dimer acid diisocyanate; hydrogenated diisocyanate such as hydrogenated TDI (HTDI), hydrogenated XDI (H6XDI) or hydrogenated MDI (H12MDI); dimers, trimers or higher polymers of these diisocyanates; and adducts of the diisocyanates with water or a polyhydric alcohol.

Examples of blocking agents include oximes such as methyl ethyl ketoxime, acetoxime, cyclohexanone oxime, acetophenone oxime or benzophenone oxime; phenols such as m-cresol or xylenol; alcohols such as methanol, ethanol, butanol, 2-ethylhexanol, cyclohexanol or ethylene glycol monoethyl ether; lactams such as ε-caprolactam; diketones such as diethyl malonate or acetoacetate esters; mercaptans such as thiophenol; ureas such as thiourea; imidazoles and carbamic acids.

Blocked polyisocyanates are produced by reacting the polyisocyanate compounds with the blocking agents until free cyanato groups disappear. Examples of commercial products include DESMODUR series from Sumitomo Bayer Urethane K.K., VERNOC D series from Dainippon Ink And Chemicals, Inc., TAKENATE B series from Takeda Chemical Industries, Ltd., and CORONATE 2500 series from Nippon Polyurethane K.K. Oxime or lactam blocked polyisocyanates are preferable.

The second class of the curing agents are aminoplast resins such as melamine resins, benzoguanamine resins, glycolurea resins and urea resins. Alkyl etherified melamine or benzoguanamine resins are preferable. A particularly preferred class of alkyl etherified melamine resins are those having methyl or butyl or both. This class of melamine resins are stable in the coating composition upon storage and are hydrophobic in nature. Because of this, these type of melamine resins tend to migrate toward the surface portion of the coating film to increase the crosslinking density of that portion compared with the remainder of the film. As a result, the surface portion becomes less susceptible to staining or soiling. Such melamine resins are commercially available and examples thereof are listed below.

| Alkoxy, mole % | Name |
| --- | --- |
| methoxy:i-butoxy = 60:40 | CYMEL 238 (Mitsui Cytech) |
| methoxy:butoxy = 60:40 | CYMEL 235 (Mitsui Cytech) |
| methoxy:butoxy = 65:35 | CYMEL 232 (Mitsui Cytech) |
| methoxy:butoxy = 40:60 | CYMEL 236 (Mitsui Cytech) |
| methoxy:butoxy = 70:30 | CYMEL 266 (Mitsui Cytech) |
| methoxy:butoxy = 70:30 | CYMEL 267 (Mitsui Cytech) |
| butoxy = 100 | MYCOAT 506 (Mitsui Cytech) |
| butoxy = 100 | YUBAN 20SE (Mitsui Toatsu) |
| butoxy = 100 | YUBAN 20N-60 (Mitsui Toatsu) |

Benzoguanamine resins may also be used provided they meet the above-mentioned requirements.

Component (c)

As is well-known in the art, an alkoxysilyl group reatcs with water to hydrolyze the alkoxysilyl group to a hydrosilyl group. The hydrosilyl group thus formed condensates with another alkoxysilyl group to produce an alcohol as a by-product. Water is also produced as a by-product by the condensation reaction between two silanol groups. Consequently, once the hydrolysis reaction of alkoxysilyl group is initiated, a chain of the above reactions continues until an equilibrium is reached giving the alcoholic by-product and a polycondensate polymer in which a number of siloxy linkages are recurring. When the amount of water added to the reaction system is less than that required for a 100 % dealcoholation of the starting alkoxysilane, namely less than one half moles relative to the total moles of alkoxysilyl groups, the polycondensate will have a number of silanol and alkoxysilyl groups in the molecule. The term "a hydrolysate/polycondensate of tri- or tetraalkoxysilane having a percent hydrolysis/dealcoholation of less than 100 %" as used herein refers to the above polycondensate having a number of silyl and alkoxysilyl groups.

The starting alkoxysilanes have the formula:

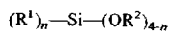

wherein $R^1$ is $C_1$–$C_6$ alkyl such as methyl, ethyl, propyl, butyl or pentyl, epoxyalkyl such as glycidoxypropyl or epoxycyclohexylethyl, aryl such as phenyl or benzyl, alkenyl such as vinyl, allyl, acryloyloxypropyl or methacryloyloxypropyl; $R^2$ is $C_1$–$C_6$ alkyl such as methyl, ethyl, propyl, butyl or pentyl; and n is 0 or 1. The group $R^1$ modifies the hydrolyzate/polycondensate to improve the reactivity or compatibility thereof. Normally $R^1$ is an alkyl.

Specific examples of the alkoxysilane compounds (silane monomer) are tetraalkoxysilanes such as tetramethoxysilane, tetraethoxysilane, tetrapropoxysilane or tetrabutoxysilane; and trialkoxysilanes such as methyltrimethoxysilane, methyltriethoxysilane, ethyltrimethoxysilane, ethyltriethoxysilane, propyltrimethoxysilane, propyltriethoxysilane, benzyltrimethoxysilane, benzyltriethozysilane, allyltirmethoxysilane or allytriethoxysilane. The symbol n representing the number of alkoxy groups is 0 or 1. When starting from mono- or dialkoxysilane, the number of reactive alkoxysilyl or silanol groups decreases with decrease in the curability of the hydrolyzate/polycondensate. The number of carbon atoms in the alkyl group is preferably from 1 to 3, namely methyl, ethyl or propyl. Methyl and ethyl are most preferred. When starting from alkoxysilanes having a large number of carbon atoms in the alkoxy group, the hydrolysis and condensation reaction thereof proceeds only with difficulty and the resulting product requires higher temperatures and longer period of time in the baking step of the coating composition containing the same. Accordingly, examples of preferred starting alkoxysilanes are tetramethoxysilane, tetraethoxysilane, ethyltrimethoxysilane and methyltriethoxysilane. Tetramethoxy- or tetraethoxysilane is most preferable.

The hydrolyzate/polycondensate is produced by the known method, namely by reacting the silane monomer with a necessary amount of water in the presence of a catalyst while removing an alcohol from the reaction system. Alternatively, oligomers having higher degree of polymerization may be prepared by similar reactions starting from lower molecular weight oligomers. The amount of water depends upon desired percent hydrolysis/dealcoholation. When the amount of water in moles is equal to one half relative to the total moles of alkoxysilyl groups present in the starting silane monomer or oligomer, a 100% dealcoholation is achieved. Percent hydrolysis/dealcoholation or percent hydrolysis as used hereinafter or elsewhere as a synonym thereof is calculated based on the amount of water actually used in the reaction relative to that required to achieve the 100% dealcoholation. Percent hydrolysis is theoretically greater than 0% but less than 100%. A 100% hydrolyzate/polycondensate is a solid silica and products having a percent hydrolysis of greater than 70% are solid or gel. Products having a percent hydrolysis from 60% to 70% are viscous and easily gelled with only trace amount of water in the atmosphere. In other words, they are unstable upon storage. A percent hydrolysis between about 30% and about 60% is preferable. However, products having higher percent hydrolysis could be made storage stable if an appropriate solvent is selected.

Deionized water, pure or ultrapure water are used in the reaction to advantage. Impurities such as ions present in water can often degrade the performance of the coating film if remaining therein. If necessary, a catalyst may be used in the reaction. Examples of catalysts are inorganic acids such as hydrochloric, sulfuric, nitric or phosphoric acid; organic acids such as a carboxylic or sulfonic acid; inorganic bases such as ammonia, sodium hydroxide; and organic bases such as amines. Solvents such as alcohols, ethers or ketones may also be used in the reaction.

The resulting reaction product comprises oligomers containing monomer, dimer, trimer or higher polymers. When the reaction product contains an excess of monomer, the storage stability of the product per se or compositions containing the product may be impaired. The presence of excessive amounts of monomer may adversely affect the performance of the coating films such as resistance to water, acid, alkali and cracking. Therefore, the monomer content is decreased to less than 1%, preferably less than 0.3% by weight of the reaction product using the known method.

A hydrolyzate/polycondensate of tetramethoxysilane containing less than 1% by weight of the monomer are commercially available from Mitsubishi Chemical Corporation under the trade names of MKC silicate MS51 and MS56.

The products of this type are highly reactive and do not require higher baking temperatures and longer period of time for baking the composition containing the same. The percent hydrolysis preferably ranges between 10% and 65%, more preferably between 30% and 60%. The above MKC silicate MS51 has a percent hydrolysis of about 40%, a $SiO_2$ content of about 52%, while MKC silicate MS56 has a percent hydrolysis of about 50% and a $SiO_2$ content of about 56%.

Corresponding hydrolyzate/polycondensates may be prepared from tetraethoxysilane. In this case, the $SiO_2$ content is normally about 40 %. Examples of commercial products include ES-40 from Colcoat K.K., SILICATE 40 from Tama Chemical K.K., TES 40 from Hoechst, SILBOND 40 from Stauffer and ETHYL SILICATE 40 from Union Carbide.

Preferably the hydrolyzate/polycondensate occurs as particles exhibiting a inertial radius of less than 100 angstrom (10 nm) in the small angle X ray scattering method. On the other hand, conventional dry silica such as fumed silica or wet method silica such as silica sol used in the coating industry has a particle size greater than 100 angstrom. Furthermore, the hydrolyzate/polycondensate used in the present invention contains more functional groups than the conventional silica. Normally, the hydrolyzate/polycondensate contains a total of 0.1 to 3 moles, preferably from 0.5 to 2.7 moles of SiOH and SiOR groups per atom of silicon. The molar ratio of SiOH to SiOR varies with particular monomers, percent hydrolysis, particular solvents used in the reaction and dilution. For example, when different alcoholic solvents are used in the reaction and dilution, transesterification can occur. In case of isolated hydrolyzate/polycondensate suspended in isopropanol, it contains 0.72±0.13 moles of SiOH, 0.64±0.12 moles of SiOEt, and 0.30±0.06 moles of SiOiPr per atom of silicon two days after the reaction when determined by the H-NMR and CHN analysis. The quantity of functional groups varies with time. When storing at room temperature for 60 days, the above values have changed to 0.4 moles, 0.36 moles and 0.17 moles, respectively. This demonstrates that the hydrolyzate/polycondensate is chemically stable upon storage. On the other hand, conventional silica contains only a trace amount of reactive groups. For example, dry silica having a particle size of about 100 angstrom available from Nippon Aerosil K.K. under the trade name of AEROSIL 200 contains $2 \times 10^{-5}$ moles of SiOH per atom of silicon, and silica sol having a particle size of about 100 angstrom available from Nissan Chemical Industries, Ltd. contains $4 \times 10^{-5}$ moles of SiOH per atom of silicon. The presence of large quantities of these reactive groups is advantageous because they react with each other and with the binder resin when the coating film is baked.

Most preferable hydrolyzate/polycondensate is reactive ultrafine silica particles disclosed in WO 95/17349. Briefly, this product is produced starting from tetramethoxysilane or its oligomer. The starting material is then hydrolyzed and condensed by maturing in the presence of an amount of water greater than required to achieve 100% hydrolysis, namely greater than 0.5 times water in molar ratio relative to total methoxy group possessed by the starting material. The amount of water in molar ratio relative to methoxy may range between 0.5 and 1.0, preferably between 0.5 and 0.75. Excessive water often causes gelling. Conversely, the reaction does not proceed satisfactory with insufficent amounts of water.

The reaction may be conducted in the presence of a catalyst. Examples thereof include inorganic acids such as hydrocholic, sulfuric or phosphoric acid; organic acid such as formic, acetic, propionic, oxalic, p-toluenesulfonic, benzoic, phthalic or maleic acid; alkali such as potassium hydroxide, sodium hydroxide, calcium hydroxide or ammonia; organotin compounds such as dibutyltin dilaurate, dibutyltin dioctoate or dibutyltin diacetate; chelates such as aluminum tris(acetylacetonate), titaninium tetrakis (acetylacetonate), dibutoxytitanium bis(acetylacetonate), diisopropoxytitanium bis(acetylacetonate), zirconium tetrakis(acetylacetonate), dibutoxyzirconium bis (acetylacetonate), or diisopropoxyzirconium bis (acetylacetonate); and boron compound such as boron buthoxide or boric acid. Acetic acid, maleic acid, a metal alkoxide, or a boron compound is preferable.

The silica particles occur as a suspension in water or an organic solvent. They have an inertial radius of less than 10 angstrom when determined by the small angle X ray scattering method. The weight average molecular weight of silica particles lies between 1.000 and 3.000 by the GPC method using polystyrene standard. Most of particles have a weight average molecular weight from 1,400 to 2,000. The molar ratio of hydroxyl group to methoxy group normally exceeds 0.8. This makes the silica particles highly reactive althrough they are storage stable. The silica particle suspension per se is capable of forming a very hard film having excellent heat resistance, anti-soiling and hot water resistance. Accordingly, when incorporating into a coating formulation containing a polyol resin and a curing agent, it enhances the hardness, alkali resistance and other properties of the coating film remarkably.

A diluent such as water or organic solvents may be added during or after the reaction of the starting material. Any organic solvent conventionally used in coating compositions may be used. Examples thereof include alcohols such as methanol, ethanol, isopropyl alcohol, n-butanol, isobutanol, n-propyl alcohol, octanol or acetone alcohol; glycols and glycol derivatives such as ethylene glycol, ethylene glycol monomethyl ether, ethylene glycol mono-n-propyl ether, ethylene glycol monobutyl ether, diethylene glycol monomethyl ether, diethylene glycol monoethyl ether, propylene glycol monomethyl ether, propylene glycol monoethyl ether, ethylene glycol monomethyl ether acetate, ethylene glycol monoethyl ether acetate or propylene glycol monoethyl ether acetate; hydrocarbons such as benzene, toluene, xylene or kerosin; esters such as methyl acetate, ethyl acetate, butyl acetate or ethyl acetoacetate; ketones such as acetone, methyl ethyl ketone, methyl isobutyl ketone or acetylacetone; and ethers such as ethyl ether, butyl ether, dioxane, furan or tetrahydrofuran. Alcohols such as methanol, ethanol, isopropanol or butanol are preferable to increase storage stability. Because these solvents have a relatively low boiling or flash point, a conventional hydrocarbon, glycol or ketone solvent having a high boiling point may be mixed therewith. The amount of alcoholic solvents is from 50 to 5,000, preferable from 100 to 1,000 parts by weight per 100 parts of tetramethoxysilane. When water is diluent, it may be added by increasing the amount of water for reaction or an additional amount of water may be added after the completion of the reaction. Preferably, water is used in an amount from 20 to 300 parts by weight per 100 parts of tetramethoxysilane inclusive of water for reaction. In order to prevent gelling, the suspension diluted with water is adjusted to a pH less than 3, preferably 1 to 2.

The hydrolyzate/polycondensate may be treated with a silane coupling agent to control the reactivity thereof. This treatment is effective to enhance the storage stability of coating compositions containing the same and also to improve anti-chemical and other properties of films of the composition.

The silane coupling agent usable for this purpose has the formula:

$$R^3Si(R^4)_m(OR^4)_{3-m}$$

wherein $R^3$ is a hydrocarbon residue optionally containing a functional group; $R^4$ is $C_1$–$C_6$ alkyl, m is 0, 1 or 2. Trimethoxysilane type coupling agents are preferable due to reactivity with the hydrolysate/polycondensate. Examples of the hydrocarbon residue $R^3$ include γ-methacryloylpropyl, γ-glycidoxypropyl, methyl, vinyl, phenyl, n-propyl, isobutyl, n-decyl, n-hexadecyl, trimethoxysilylhexyl, γ-dibutylaminopropyl and nonafluorobutylethyl.

Non-limiting examples of coupling agents are trimethylmethoxysilane, trimethylethoxysilane, phenyltrimethoxysilane, diphenyldimethoxysilane, n-propyltrimethoxysilane, isobutyltrimethoxysilane, n-decyltrimethoxysilane, n-hexyltrimethoxysilane, 1,6-bis (trimethoxysilyl)hexane, γ-ureidopropyltrimethoxysilane, γ-dibutylaminopropyltrimethoxysilane, nonafluorobutylethyltrimethoxysilane, γ-glycidoxypropylmethyldimethoxysilane, γ-(2-aminoethyl) -aminopropyltrimethoxysilane, γ-(2-aminoethyl)- aminopropylmethyldimethoxysilane, γ-methacryloyloxypropyltrimethoxysilane, γ-glycidoxypropyltrimethoxysilane, γ-mercaptopropyltrimethoxysilane, methyltrimethoxysilane, methyltriethoxysilane, γ-chloropropyltrimethoxysilane, γ-anilinopropyltrimethoxysilane, cyclohexylmethyldimethoxysilane, vinyltrimethoxysilane, dimethyldimethoxysilane, and octadecyldimethyl [3- (trimethoxysilyl)propyl]ammonium chloride.

The amount of silane coupling agent is such that the molar ratio thereof to the sum of SiOH and SIOR groups present in the hydrolysate/polycondensate is 0.05 to 1. Excessive amounts of the coupling agent will remain unreacted and may adversely affect the performance of the coating film.

The treatment is carrier out by allowing the mixture to stand or by stirring at room temperature for one day. If necessary, the mixture may be warmed at an appropriate temperature to promote the reaction. Care should be taken during the warming to prevent viscosity increase or gelling of the mixture by controlling the temperature appropriately.

The hydrolyzate/polycondensate in general, and even those produced by the conventional method such as MKC silicate MS51 and MS56 available from Mitsubishi Chemical Corporation are effective to improve the hardness of coating films when added to a coating composition according to this invention. This is because reactive functional groups present in the hydrolysate/polycondensate react with each other or with the binder resin to increase the apparent crosslinking density of the cured film. In addition, since the reaction between the binder resin and the curing agent occurs preferentially during the baking step, the proportion of newly formed —Si—O—C— and —Si—O—Si— linkages in the cured film is minimized. This contributes to retention of desired acid and alkali resistance and hardness properties of the film. On the other hand, increased apparent crosslinking density and hardness can not be expected with the use of conventional dry silica or silica sol having only a trace amount of reactive groups. Ultrafine silica such as fumed silica having a particle size as fine as 100 argstrom or greater is known as a thickening agent and is widely used as an anti-sagging agent in the coating industry. Even with 1% addition, it increases the viscosity of the coating composition drastically and thus higher percentage e.q. 10% of addition is not feasible.

Using the silica particle suspension disclosed in WO 95/17349, several additional advantages are achieved.

This product occurs as individual particles in the suspension and is abundant in reactive functional groups. Because of this, individual particles agglomerate into larger hard particles surrounded by the matrix of relatively soft resin during the curing step. It is for this reason that the hardness requirement is compatible with the flexibility and other mechanical strength requirements in the cured film.

Reactive functional groups present in this product may also react with functional groups present in the matrix resin. Because of this, the self-condensed hard particles thereof are bound chemically to the surrounding matrix resin in the cured film. It is for this reason that the presence of hard particles in the film does not adversely affect the mechanical strength of the film.

As stated before, the reaction between the binder resin and the curing agent occurs preferentially during the curing step. This prevents creation of —Si—O—C— and —Si—O— Si— linkages which weaken the resistance to alkali and acid of the film. As a result, a film having a pencil hardness greater than 4H may be obtained without compromising the alkali and acid resistance.

Component (d)

As is well-known, blocked polyisocyanate curing agents require a catalyst. Examples thereof include organotin compounds such as dibutyltin dilaurate, dibutyltin dioctoate or dibutyltin diacetate; and chelates such as aluminum tris (acetylacetonate), titaninium tetrakis(acetyl-acetonate), dibutoxytitanium bis(acetylacetonate), diisopropoxytitanium bis(acetylacetonate), zirconium tetrakis (acetylacetonate), dibutoxyzirconium bis(acetylacetonate), or diisopropoxyzirconium bis(acetylacetonate). Tin catalysts are normally used.

When aminoplast resins are used, an acid catalyst is used. Examples thereof include dodecylbenzenesulfonic acid, dinonylnaphthalenesulfonic acid, p-toluenesulfonic acid and other aromatic sulfonic acids; aminotri (methylenephosphonic acid), 1-hydroxyethylidene-1, 1-diphosphonic acid and other organic phosphonic acids; and amine addition salts of these acids.

Optionally, a catalyst for promoting the reaction of the hydrolyzate/polycondensate may be added. For this purpose, the same catalyst as used in the production thereof may be used. However, the silica particles suspension disclosed in WO 95/17349 does not require such a catalyst due to its high self-crosslinkability.

Resin Composition

When the curing agent (b) is a blocked polyisocyanate, the polyol resin (a) and the curing agent (b) are combined at a blocked NCO/OH equivalent ratio from 0.8 to 1.5, preferably from 1.0 to 1.2. The amount of catalyst (d) is generally from 0.02 to 5 parts, preferably from 0.1 to 1.0 parts by weight per 100 parts by weight of the blocked polyisocyanate.

When the curing agent (b) is an aminoplast resin, the polyol resin (a) and the curing agent (b) are combined at a weight ratio from 6:4 to 9:1 as solids. The amount of acid catalyst is generally less than 5% preferably from 0.02% to 1.0% by weight of the sum of the polyol resin (a) and the curing agent (b) as solids. Excessive addition of the acid catalyst adversely affect the storage stability and other performance of coating compositions containing the resin composition.

The hydrolyzate/polycondensate (c) is incorporated in a proportion from 1 to 300 parts, preferably from 10 to 200 parts by weight per 100 parts by combined weight of the polyol resin component (a) and the curing agent (b) as solids. Excessive addition of component (c) can adversely affect the storage stability and coatability of the composition. When component (c) is present in excess in the composition, a large amount of unreated SiOR or SiOH groups will remain in the cured film causing decrease in acid and alkali resistance and water resistance properties as well as the susceptibility to cracking. An alkoxysilane hydrolyzate/polycondensate mainly consisting of linear molecules such as triethoxysilane hydrolysate/polycondensate generally requires from 50 to 100 parts by weight per 100 parts by combined weight of the polyol resin component (a) and the curing agent (b) as solids in order to achieve desired hardness. The silica particles disclosed in WO 95/17349 may be used in lesser amounts to achieve the corresponding level of hardness.

Coating Compositions

Coating compositions are prepared preferably by mixing components (a) and (c) uniformly, dispersing a pigment paste in the mixture, and finally incorporating the remaining components (b) and (d) together with conventional additives such as solvent if necessary.

Any solvent conventionally used in the preparation of coating compositions may be used. Examples thereof include aromatic hydrocarbons such as toluene, xylene, Solvesso 100 or Solvesso 150; esters such as ethyl or butyl acetate; ketones such as methyl ethyl ketone, methyl isobutyl ketone, cyclohexanone or isophorone; alcohols such as butanol, octanol or diacetone alcohol; glycol derivatives such as ethylene glycol monomethyl ether, ethylene glycol monobutyl ether, diethylene glycol monomethyl ether, diethylene glycol monoethyl ether, propylene glycol monomethyl ether, propylene glycol monobutyl ether, ethylene glycol monomethyl ether acetate, ethylene glycol monoethyl ether acetate or propylene glycol monoethyl ether acetate; and mixtures of these solvents.

Depending upon intended application, the coating composition may contain coloring pigments such as titanium dioxide, carbon black, iron oxide, various fired pigments, cyanine blue or cyanine grey; extender pigments such as calcium carbonate, clay or barium sulfate; metal powders such as aluminum powder; matting agents such as silica or alumina; other conventional additives such as defoaming agent, leveling agent, anti-sagging agent, surface conditioner, viscosity adjusting agent, dispersing agent, UV absorber or wax.

Pigments are normally incorporated as a pigment paste produced by milling the pigment with a portion of polyol resin (a) or another pigment dispersant resin. Although other methods can be employed, the pigment paste is mixed with the remaining portion of the polyol resin (a) and the alkoxysilane hydrolysate/condensate (c). Finally the curing agent (b) and other additives are added to the mixture. Roll mills, paint shakers, pot mills, dispersers, beads mills and other conventional machines may be employed to disperse pigments and other components.

Any conventional coating method and apparatus may be used depending upon the intended application including roller coating, air spray coating, airless spray coating or curtain flow coating. The baking temperature will vary with the nature of particular curing agents employed and is generally from 140° C. to 240° C. The length of time is a function of the baking temperature and is generally from 30 seconds to 20 minutes. When a curing time from 30 seconds to 2 minutes is desired, it is necessary to control the substrate temperature in a range between 190° C. and 230° C. Although the coating composition of this invention may be directly applied on the substrate, it is preferable for those applications requiring high corrosion resistance and adhesion that the substrate be coated with a primer coating such as epoxy primers, polyurethane-modified epoxy primers, or polyester primers, then with the coating composition of this invention using the two coats/two bake method or two coats/one bake method.

The substrate may be galvanized steel sheets, galvanealed steel sheet, zinc-aluminum plated steel sheets, aluminum plated steel sheets, aluminum and aluminum alloys, stainless steel sheets, copper and copper alloys, titanium and titanium alloys, cold rolled steel sheets, metal vapor deposited sheets, and various articles formed from metal sheets. Also included are plastics, plastic composites such as FRP, artificial marble and slate. Metal substrates may be surface treated with zinc phosphate, reactive chromate, or chromate coating. A thin film of organic composite may be applied on the chromate treated surface.

The coating composition of this invention finds use not only in precoated metal sheets and post coatings but also in other applications in which high hardness and high alkali resistance as well as high anti-staining or anti-soiling properties against rain, acid rain and exhaust gas are required. Accordingly, the coating composition of this invention is well suited for finishing building roofs and walls, road fences, poles, guard rails, beam coverings, tunnel linings, cars and aircrafts.

Examples

The following examples are given for illustrative purpose only. All parts and percents therein are by weight unless otherwise indicated.

Production Examples 1–5

Acrylic polyol resin

A reaction vessel equipped with a stirrer, reflux condenser and heating means was charged with 80 parts of xylene and 20 parts of n-butanol, and then heated to 110° C. with stirring. To this was added dropwise a monomer mixture shown in Table 1 below over 3 hours. After the addition, the mixture was kept at 110° C. for 30 minutes. Then 0.5 parts of t-butylperoxy-2-ethylhexanoate were added. The mixture was kept at 110° C. with stirring for 2 hours. Acrylic polyols A through E were obtained.

TABLE 1

| Monomer parts | Production Example 1 | 2 | 3 | 4 | 5 |
|---|---|---|---|---|---|
| Methyl methacrylate | 26.5 | 23.0 | 35.2 | 36.7 | 44.5 |
| Ethyl acrylate | — | — | — | 31.6 | — |
| 2-Ethylhexyl methacrylate | 23.5 | 50.7 | 24.7 | — | — |
| n-Butyl methacrylate | 31.5 | 7.7 | 22.3 | — | 32.5 |
| Methacrylic acid | — | — | 2.0 | — | — |
| 2-Hydroxyethyl acrylate | 18.6 | 18.6 | 15.8 | — | 18.6 |
| PCL FM-2[1] | — | — | — | 31.9 | — |
| γ-Methacryloyloxy-propyltrimethoxysilane | — | — | — | — | 4.4 |
| t-Butylperoxy-2-ethylhexanoate | 1.0 | 1.0 | 1.0 | 5.0 | 1.0 |
| Polymer | A | B | C | D | E |
| Nonvolatiles, % | 50.0 | 50.0 | 50.0 | 50.0 | 50.0 |
| OH number, mgKOH/g | 80 | 80 | 68 | 50 | 80 |
| Mn | 8000 | 8000 | 8000 | 5000 | 9000 |

[1] 2-hydroxyethyl methacrylate/ε-caprolactone 1:2 adduct, Daicel Chemical Industries, Ltd.

Production Example 6
Polyester polyol resin

A reaction vessel equipped with a heater, stirrer, reflux condenser, water separator, distillation column and thermometer was charged with 36.2 parts of dimethyl phthalate, 20.1 parts of neopentyl glycol and 22.8 parts of 1,6-hexanediol. When the mixture became molten and agitatable by the application of heat, the reaction was allowed to proceed in the presence of 0.02 parts of dibutyltin oxide by raising the temperature to 210° C. at a constant rate over 4 hours. During this period, methanol produced by the transesterification reaction was removed from the reaction system. After cooling to 100° C., 31.0 parts of isophthalic acid and 4.2 parts of ε-caprolactone (PLACCEL M sold by Daicel Chemical Industries, Ltd.) were added to the reaction vessel followed by heating the mixture to 250° C. During this period, the temperature was raised at a constant rate over 4 hours from 180° C. to 250° C. while removing water produced by the condensation reaction. After maintaining the temperature at 250° C. for 1 hour, the reaction was allowed to proceed with the addition of 5 parts of xylene until an acid number of 1.0 was reached. After cooling to 100° C., the reaction mixture was diluted with 50 parts of Solvesso 150 and 50 parts of cyclohexanone. A polyester resin having a nonvolatile content of 50%, a hydroxyl number of 15, and a number average molecular weight of 8,000 was obtained.

Production Example 7
Modified silicone polyol

A reaction vessel equipped with a stirrer, reflux condenser and heating means was charged with 25 parts of xylene, 1,2 parts of maleic anhydride, 0.04 parts of dibutyltin oxide and 20 parts of polysiloxane of the formula:

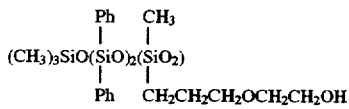

After heating the mixture at 90° C. for 1 hour, 35 parts of xylene and 20 parts of methyl isobutyl ketone (MIBK) were added thereto. After elevating the inner temperature to 110° C., the following monomer mixture was added dropwise over three hours.

| Material | Parts |
|---|---|
| Methyl methacrylate | 40.0 |
| 2-Ethylhexyl methacrylate | 25.0 |
| Methacrylic acid | 3.0 |
| 2-Hydroxyethyl acrylate | 12.0 |
| t-Butylperoxy-2-ethylhexanoate | 1.2 |

After the addition, the reaction mixture was kept at 110° C. for 30 minutes and then 0.5 parts of t-butylperoxy-2-ethylhexanoate were added thereto. The reaction mixture was then kept at 110° C. for 2 hours with stirring. Modified silicone polyol having 55 % nonvolatiles, a hydroxyl number of 85 and a number average molecular weight of 6,000 was obtained.

Production Example 8
Alkoxysilyl-containing acrylic resin

The same reaction vessel as used in Production Example 7 was charged with 80 parts of xylene and 20 parts of n-butanol and then heated to 110° C. with stirring. To this was added dropwise the following mixture over 3 hours.

| Material | Parts |
|---|---|
| Methyl methacrylate | 41.8 |
| Ethyl acrylate | 37.0 |
| n-Butyl methacrylate | 8.5 |
| γ-Methacryloyloxypropyltrimethoxysilane | 12.7 |
| t-Butylperoxy-2-ethylhexanoate | 1.0 |

After the addition, the mixture was kept at 110° C. for 30 minutes and then 0.5 parts of t-butylperoxy-2-ethylhexanoate were added thereto. Thereafter the mixture was kept at 110° C. for 2 hours. An alkoxysilyl-containing acrylic resin having 50 % nonvolatiles, an alkoxysilyl equivalent weight of 623 and a number average molecular weight of 10,000 was obtained.

Production Example 9
Reactive ultrafine silica particles

A 500 ml four necked round flask equipped with a stirrer, reflux condenser and thermometer was charged with 234 parts of tetramethoxysilane and 74 parts of methanol with stirring. Then 22.2 parts of 0.05% hydrochloric acid were added and allowed to react at an inner temperature of 65° C. for 2 hours. After replacing the reflux condenser with a distillation column, the inner temperature was raised to 130° C. to remove methanol from the reaction system. A hydryzate/polycondensate, hereinafter called "tetramethoxysilane oligomer", having a percent hydrolysis of 40% and a number average molecular weight of 550 was obtained. Oligomers having a degree of polymerization from 2 to 8 were detected therein. The monomer content was 5%. The resulting oligomer was transferred to another flask heated to 130° C., heated to 150° C. while removing the monomer vapor with an inert gas, and then maintained at the same temperature for 3 hours. The monomer content was 0.2%. Thereafter 30.77 parts of the resulting oligomer were mixed with 6.52 parts of chloride-free water, 0.31 parts of alminum tris-acetylacetonate and 62.4 parts of ethylene glycol monomethyl ether and the mixture allowed stand at room temperature for 1 day. A colorless, transparent and homogenous suspension of reactive ultrafine silica particles was obtained.

17

Examples 1-11 and Comparative Examples 1-8
Coating Composition

According to the formulations shown in Tables 2 and 3, pigment was milled with a polyol resin (a) and a hydrolyzate/polycondensate of alkoxysilane (c) in a sand grind mill for 1.5 hours at 30° C. until a particle size measured by a particle size gauge of less 5 μm was reached. Then a curing agent (b)and 0.1% by combined weight of the polyol resin (a) and the curing agent (b) of dibutyltin dilaurate were added and mixed in a dispersing device.

Coated Test Sheet
Substrate:
Zinc phosphate-treated galvanized steel sheet having a thickness of 0.4 mm.

Primer:
A polyester-based primer (FLEKICOAT P600 primer sold by Nippon Paint Co., Ltd.) was applied to a dry film thickness of 5 μm using a bar coater and baked at 220° C. (substrate temperature) for 1 minute.

Over Coating:
Each of the above coating composition was applied on the primer coating to a dry film thickness of 20 μm and baked at 220° C. (substrate temperature) for 1 minute.

Evaluation Method
Curability:
The coated substrate was rubbed with a piece of gauge fabric impregnated with xylene at 100 reciprocations at a load of 1 kg.

G(good): No change; F(fair): Partly dissolved;
B(bad) : Substrate exposed.

Anti-soiling:
The test sheet was exposed to natural rain for 3 months and washed with water. The appearance was visually observed after washing.

G: Cleansed; B: Not cleansed

Hardness:
Pencil hardness according to JIS S-6006.

Alkali resistance:
The test sheet was soaked in 5% NaOH at 20° C. for 12 hours and the change in appearance of the film was observed.

G: No change; F: Blister occurrence;
B: Dissolution of film

Acid resistance:
The test sheet was soaked in 5% HCl at 20° C. for 12 hours and the change in appearance of the film was observed.

G: No change; F: Blister occurrence;
B: Dissolution of film

Moisture stability:
20 g of the coating composition was taken in a bottle and exposed to an atmosphere having R.H. of 70% at 20° C. for 24 hours. Then a mixture of 10 g of xylene and 10 9 of n-butanol was added to the bottle with stirring.

G: Remains dissolved; B: Remains gelled

Film: formability:
The coating film as coated by the above method was visually observed.

G: Flat film free from wrinkles;
B: Wrinkles and cracks

Material
Pigment:
TAIPAQUE CR97; titanium dioxide sold by Ishihara Sangyo Kaisha Ltd.

18

Polyol resin:
TA-22-293J; polyester polyol resin having a hydroxyl number of 171 sold by Hitachi Chemical Polymer Co., Ltd.

ZEFFLE GK300; fluororesin polyol having a hydroxyl number of 60 sold by Daikin Industries, Ltd.

Alkoxysilane hydrolyzate/polycondensate:
MKC silicate MS51; tetramethoxysilane hydrolysate/polycondensate having an $SiO_2$ content of 52% sold by Mitsubishi Chemical Corporation.

MKC silicate MS56; the same as above having an $SiO_2$ content of 56%.

Reactive ultrafine silica particles ; see, Production Example 9.

Curing agent:
DESMODUR BL 3175; Methyl ethyl ketoxime blocked HMDI sold by Sumitomo Bayer Urethane K.K.

CORONATE 2515; Lactam blocked HMDI sold by Nippon Polyurethane K.K.

DESMODUR BL 4165; Methyl ethyl ketoxime blocked IPDI sold by Sumitomo Bayer Urethane K.K.

Results
The evaluation results are shown in Table 4 and Table 5.

TABLE 2

| Material, parts as solids | \multicolumn{11}{c}{EXAMPLE} |
|---|---|---|---|---|---|---|---|---|---|---|---|
| | 1 | 2 | 3 | 4 | 5 | 6 | 7 | 8 | 9 | 10 | 11 |
| TAIPAQUE CR 97 | 50 | 50 | 50 | 50 | 50 | 50 | 50 | 50 | 50 | 50 | 50 |
| Acrylic A | | | | 21 | | | | | | | |
| Acrylic B | 21 | 21 | 21 | | | | | | | | |
| Acrylic C | | | | | 22 | | | | | | |
| Acrylic D | | | | | | 23 | | | | | |
| Acrylic E | | | | | | | 21 | | | | |
| TA 22-293 J | | | | | | | | 16 | | | |
| Polyester | | | | | | | | | 26 | | |
| ZEFFLE GK 300 | | | | | | | | | | 22 | |
| Modified silicone | | | | | | | | | | | 20 |
| SILICATE 40 | 20 | | | | | | | | | | |
| MKC silicate MS 51 | | 20 | | | | | | | | | |
| MKC silicate MS 56 | | | 20 | | | 20 | | | | | |
| Silica particles of Pro. Ex. 9 | | | | 20 | 20 | 20 | | 20 | 20 | 20 | 20 |
| DESMODUR BL 3175 | 9 | 9 | 9 | 9 | 8 | 7 | 9 | | | | |
| CORONATE 2515 | | | | | | | | 14 | 4 | | 10 |
| DESMODUR BL 4165 | | | | | | | | | | 8 | |

TABLE 3

| Material, parts as solids | \multicolumn{8}{c}{COMPARATIVE EXAMPLE} |
|---|---|---|---|---|---|---|---|---|
| | 1 | 2 | 3 | 4 | 5 | 6 | 7 | 8 |
| TAIPAQUE CR 97 | 50 | 50 | 50 | 50 | 50 | 50 | 50 | 50 |
| Acrylic A | 30 | | | | 35 | | | |
| TA 22-293J | | | 30 | | | 26 | | |
| Polyester | | | | 20 | | | | |
| ZEFFLE GK 300 | | | | | | | 37 | |
| Modified silicone | | | | | | | | 34 |
| Alkoxysilyl resin | | 30 | | | | | | |
| MKC silicate MS 51 | | | 20 | | | | | |
| MKC silicate MS 56 | | 20 | | | | | | |
| Silica particles of Pro. Ex. 9 | 20 | 20 | | | | | | |
| DESMODUR BL 3175 | | | | 15 | | | | |
| CORONATE 2515 | | | | | | 24 | | 16 |
| DESMODUR BL 4165 | | | | | | | 13 | |

TABLE 4

| Item | EXAMPLE | | | | | | | | | | |
|---|---|---|---|---|---|---|---|---|---|---|---|
| | 1 | 2 | 3 | 4 | 5 | 6 | 7 | 8 | 9 | 10 | 11 |
| Curability | G | G | G | G | G | G | G | G | G | G | G |
| Anti-soiling | G | G | G | G | G | G | G | G | G | G | G |
| Pencil hardness | 2H | 3H | 3H | 4H | 3H | 3H | 2H | 5H | 2H | 4H | 4H |
| Alkali resistance | G | G | G | G | G | G | G | G | G | G | G |
| Acid resistance | G | G | G | G | G | G | G | G | G | G | G |
| Moisture stability | G | G | G | G | G | G | G | G | G | G | G |
| Film formability | G | G | G | G | G | G | G | G | G | G | G |

TABLE 5

| Item | COMPARATIVE EXAMPLE | | | | | | | |
|---|---|---|---|---|---|---|---|---|
| | 1 | 2 | 3 | 4 | 5 | 6 | 7 | 8 |
| Curability | G | G | G | G | G | G | G | G |
| Anti-soiling | G | G | G | G | F | F | F | F |
| Pencil hardness | 6H | 4H | 5H | H | H | H | H | H |
| Alkali resistance | B | B | B | B | G | G | G | G |
| Acid resistance | F | F | F | F | G | G | G | G |
| Moisture stability | G | B | G | G | G | G | G | G |
| Film formability | F | G | F | G | G | G | G | G |

Examples 12-17 and Comparative Examples 9-13

The preceeding Examples and Comparative Examples were followed according to the formulations shown in Table 6 except that the blocked polyisocyanate was replaced with a melamine resin as the curing agent (b) and the catalyst (d) was changed from a organotin compound to a dodecylbenzenesulfonic catalyst sold by Mitsui-Toatsu Chemicals Inc., sold under the trade name of CATALYST 6000 added at 1% by combined weight of the polyol resin (a) and the curing agent (b) as solids. The curing agents used are as follows:

CYMEL 238: Alkyl etherified melamine resin (methoxy: i-butoxy=60:40) sold by Mitsui Cytech Co., Ltd.

CYMEL 236: Alkyl etherified melamine resin (methoxy: i-butoxy=40:60) sold by Mitsui Cytech Co., Ltd.

CYMEL 235: Alkyl etherified melamine resin (methoxy: i-butoxy=60:40) sold by Mitsui Cytech Co., Ltd.

The evaluation results are shown in Table 7.

TABLE 6

| Material, parts as solids | EXAMPLE | | | | | | COMPARATIVE EXAMPLE | | | | |
|---|---|---|---|---|---|---|---|---|---|---|---|
| | 12 | 13 | 14 | 15 | 16 | 17 | 9 | 10 | 11 | 12 | 13 |
| TAIPAQUE CR 97 | 50 | 50 | 50 | 50 | 50 | 50 | 50 | 50 | 50 | 50 | 50 |
| Acrylic A | 21 | | | | | | | 30 | | 35 | |
| Acrylic C | | 22 | | | | | | | | | |
| Acrylic D | | | 23 | | | | | | | | |
| Acrylic E | | | | 21 | | | | | | | |
| TA 22-293 J | | | | | 16 | | | | 30 | | |
| Polyester | | | | | | 26 | | | | | 26 |
| Alkoxysilyl resin | | | | | | | 30 | | | | |
| MKC silicate MS 56 | | | | 20 | | | | 20 | | | |
| Silica particles of Pro. Ex. 9 | 20 | 20 | 20 | | 20 | 20 | 20 | | 20 | | |
| CYMEL 238 | 9 | 8 | 7 | 9 | | | | | | 15 | |
| CYMEL 236 | | | | | 14 | 4 | | | | | 24 |

TABLE 7

| Item | EXAMPLE | | | | | | COMPARATIVE EXAMPLE | | | | |
|---|---|---|---|---|---|---|---|---|---|---|---|
| | 12 | 13 | 14 | 15 | 16 | 17 | 9 | 10 | 11 | 12 | 13 |
| Curability | G | G | G | G | G | G | G | G | G | G | G |
| Anti-soiling | G | G | G | G | G | G | G | G | G | F | F |
| Pencil hardness | 4H | 3H | 3H | 2H | 5H | 2H | 6H | 4H | 5H | H | H |
| Alkali resistance | G | G | G | G | G | G | B | B | B | G | G |
| Acid resistance | G | G | G | G | G | G | F | F | F | G | G |
| Moisture stability | G | G | G | G | G | G | B | G | G | G | G |
| Film formability | G | G | G | G | G | G | F | G | F | G | G |

Production Example 10
Surface treatment with silane coupling agent

To 100 parts of silica particle suspension of Production Example 9 were added, respectively, 20 parts of γ-methacryloyloxy-propyltrimethoxysilane (Coupler A), 25 parts of γ-glycidoxypropyltrimethoxysilane (Coupler B), and 30 parts of vinyltrimethoxysilane (Coupler C). Each mixture was stirred and allowed to stand at room temperature for 1 day.

Examples 18-25 and Comparative Examples 14-16

The preceding Examples were followed according to the formulations shown in Table 8 using surface treated silica particles of Production Example 10. The resulting compositions were additionally tested for storage stability according to the following method.

Storage stability:

The composition was stored at 40° C. for 1 month and change in viscosity was measured.

G: no increase in viscosity over 1.2 times; F: increased less than 2 times; B: increase over 2 times or gelled The evaluation results are shown in Table 9.

TABLE 8

| Material, parts as solids | EXAMPLE | | | | | | | | Comp. Exam. | | |
|---|---|---|---|---|---|---|---|---|---|---|---|
| | 18 | 19 | 20 | 21 | 22 | 23 | 24 | 25 | 14 | 15 | 16 |
| TAIPAQUE CR 97 | 50 | 50 | 50 | 50 | 50 | 50 | 50 | 50 | 50 | 50 | 50 |
| Acrylic A | 21 | | | | | | | | 35 | | |
| Acrylic C | | 22 | | | | | | | | | |
| Acrylic D | | | 23 | | | | | | | | |
| Acrylic E | | | | 21 | | | | | | | |
| Polyester | | | | | 26 | | 24 | | | 37 | |
| ZEFFLE G 300 | | | | | | 22 | | | | | |
| Modified silicone | | | | | | | | 20 | | | 34 |
| Silica particles treated with: | | | | | | | | | | | |
| Coupler A | 20 | | | | | 20 | 20 | | | | |
| Coupler B | | 20 | | | | | | | | | |
| Coupler C | | | 20 | 20 | 20 | | | 20 | | | |
| CYMEL 235 | | | | | | | | 6 | | | |
| DESMODUR BL 3175 | 9 | 8 | 7 | 9 | | | | | | 15 | |
| CORONATE 2515 | | | | | 4 | | 10 | | | | 16 |
| DESMODUR BL 4165 | | | | | | 8 | | | 13 | | |

TABLE 9

| Item | EXAMPLE | | | | | | | | Com. Exam. | | |
|---|---|---|---|---|---|---|---|---|---|---|---|
| | 18 | 19 | 20 | 21 | 22 | 23 | 24 | 25 | 14 | 15 | 16 |
| Curability | G | G | G | G | G | G | G | G | G | G | G |
| Anti-soiling | G | G | G | G | G | G | G | G | F | F | F |

TABLE 9-continued

| Item | EXAMPLE | | | | | | | | Com. Exam. | | |
|---|---|---|---|---|---|---|---|---|---|---|---|
| | 18 | 19 | 20 | 21 | 22 | 23 | 24 | 25 | 14 | 15 | 16 |
| Pencil hardness | 4H | 3H | 3H | 2H | 2H | 4H | 4H | 3H | H | H | H |
| Alkali resistance | G | G | G | G | G | G | B | B | G | G | G |
| Acid resistance | G | G | G | G | G | G | F | F | G | G | G |
| Moisture stability | G | G | G | G | G | G | G | B | G | G | G |
| Film formability | G | G | G | G | G | G | F | G | G | G | G |
| Storage stability | G | G | G | G | G | G | F | G | G | G | G |

We claim:

1. A thermosetting resin composition comprising:
   (a) a film-forming polyol resin having a plurality of alcoholic hydroxyl groups corresponding to a hydroxyl number from 5 to 300 and a number average molecular weight from 500 to 20,000;
   (b) a curing agent reactive with said resin (a) selected from the group consisting of a blocked polyisocyanate and an aminoplast resin;
   (c) a hydrolyzate/polycondensate comprising reactive ultrafine silica particles having an inertial radius of 10 angstrom or less when determined by the small angle X-ray scattering method, produced by the hydrolysis and polycondensation reaction of tetramethoxysilane or an oligomer thereof in the presence of an amount of water greater than required to achieve 100% hydrolysis in theory; and
   (d) a catalyst for promoting the reaction between said resin (a) and said curing agent (b).

2. The thermosetting resin composition according to claim 1 wherein said resin (a) is an acrylic polyol resin, a polyester polyol resin, a fluorine-containing polyol resin, or a silicone polyol resin.

3. The thermosetting resin composition according to claim 1 wherein said curing agent is a blocked polyisocyanate.

4. The thermosetting resin composition according to claim 1 wherein said catalyst (d) is a organotin compound, or a chelate of aluminum, titanium or zirconium.

5. The thermosetting resin composition according to claim 1 wherein said curing agent is an aminoplast resin.

6. The thermosetting resin composition according to claim 5 wherein said aminoplast resin is an alkyl etherified melamine resin.

7. The thermosetting resin composition according to claim 5 wherein said catalyst is an organic sulfonic acid, an organic phosphonic acid, or an amine addition salt thereof.

8. The thermosetting resin composition according to claim 1 wherein said hydrolyzate/polycondensate (c) is surface treated with a silane coupling agent.

9. The thermosetting resin composition according to claim 8 wherein the molar ratio of said silane coupling agent to sum of silanol groups and alkoxysilyl groups present in said hydrolyzate/polycondensate (c) is from 0.05 to 1.

10. The thermosetting resin composition according to claim 8 wherein said silane coupling agent has the formula:

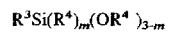

wherein $R^3$ is γ-methacryloxypropyl, γ-glycidoxypropyl, methyl, ethyl, vinyl, phenyl, n-propyl, isobutyl, n-decyl, n-hexadecyl, trimothoxysilyl, γ-dibutylaminopropyl or non-afluorobutylethyl; $R^4$ is a $C_1$–$C_6$ alkyl; and m is 0, 1 or 2.

11. The thermosetting resin composition according to claim 1 wherein the proportion of said hydrolyzate/polycondensate (c) is from 1 to 300 parts by weight per 100 parts by combined weight of said polyol resin (a) and said curing agent (b) as solid.

12. The thermosetting resin composition according to claim 11 wherein the proportion of said catalyst is from 0.02 to 5 parts by weight per 100 parts by combined weight of said polyol resin (a) and said curing agent (b) as solids.

13. A thermosetting coating composition comprising the thermosetting resin composition of claim 1.

14. A method of coating a metal substrate comprising applying the coating composition of claim 13 onto said metal substrate to form a film, and then baking said film at an elevated temperature.

* * * * *